(12) United States Patent
Shin et al.

(10) Patent No.: US 11,718,073 B2
(45) Date of Patent: Aug. 8, 2023

(54) ASYMMETRY COMPOSITE MATERIAL

(71) Applicant: LG CHEM, LTD., Seoul (KR)

(72) Inventors: Jong Min Shin, Daejeon (KR); Dong Woo Yoo, Daejeon (KR); Jin Kyu Lee, Daejeon (KR)

(73) Assignee: LG CHEM. LTD., Seoul (KR)

( * ) Notice: Subject to any disclaimer, the term of this patent is extended or adjusted under 35 U.S.C. 154(b) by 0 days.

(21) Appl. No.: 17/261,601

(22) PCT Filed: Aug. 6, 2019

(86) PCT No.: PCT/KR2019/009791
§ 371 (c)(1),
(2) Date: Jan. 20, 2021

(87) PCT Pub. No.: WO2020/032535
PCT Pub. Date: Feb. 13, 2020

(65) Prior Publication Data
US 2021/0291497 A1  Sep. 23, 2021

(30) Foreign Application Priority Data
Aug. 6, 2018 (KR) .................. 10-2018-0091348

(51) Int. Cl.
*B32B 27/06* (2006.01)
*B32B 5/18* (2006.01)
*B32B 27/36* (2006.01)

(52) U.S. Cl.
CPC .............. *B32B 27/065* (2013.01); *B32B 5/18* (2013.01); *B32B 27/36* (2013.01);
(Continued)

(58) Field of Classification Search
CPC ......... B32B 27/065; B32B 5/18; B32B 27/36; B32B 2255/062; B32B 2255/26; B32B 2266/045; B32B 2307/20; B32B 2307/54
See application file for complete search history.

(56) References Cited

U.S. PATENT DOCUMENTS

| | | |
|---|---|---|
| 3,711,363 A | 1/1973 | Jarema et al. |
| 5,895,726 A | 4/1999 | Imam et al. |

(Continued)

FOREIGN PATENT DOCUMENTS

| | | |
|---|---|---|
| CN | 101304812 A | 11/2008 |
| CN | 103118772 A | 5/2013 |

(Continued)

OTHER PUBLICATIONS

International Search Report corresponding to PCT/KR2019/009791; dated Nov. 19, 2019 (5 pages, including English translation).

(Continued)

*Primary Examiner* — Maria V Ewald
*Assistant Examiner* — Ethan Weydemeyer
(74) *Attorney, Agent, or Firm* — Myers Bigel, P.A.

(57) ABSTRACT

The present application relates to an asymmetry composite material and a method for preparing the same, which provides a composite material comprising a metal porous body (metal foam or the like) and a polymer component, and provides a method for preparing a composite material, wherein the polymer component is formed in an asymmetrical structure on both sides of the metal porous body (metal foam or the like), and a composite material prepared in such a manner.

12 Claims, 1 Drawing Sheet

(52) U.S. Cl.
CPC ..... *B32B 2255/062* (2013.01); *B32B 2255/26* (2013.01); *B32B 2266/045* (2013.01); *B32B 2307/20* (2013.01); *B32B 2307/54* (2013.01)

(56) References Cited

U.S. PATENT DOCUMENTS

| | | | |
|---|---|---|---|
| 7,632,565 | B1 | 12/2009 | Imam et al. |
| 9,364,857 | B1 | 6/2016 | Uhl et al. |
| 2005/0013933 | A1 | 1/2005 | Chen et al. |
| 2012/0189808 | A1 | 7/2012 | Wendell |
| 2013/0280583 | A1 | 10/2013 | Lee et al. |
| 2013/0287937 | A1 | 10/2013 | Joo et al. |
| 2013/0316087 | A1 | 11/2013 | Ahn et al. |
| 2016/0243733 | A1 | 8/2016 | Meyer et al. |
| 2017/0279113 | A1 * | 9/2017 | Ohsawa ............. H01M 50/461 |
| 2020/0180030 | A1 | 6/2020 | Kim et al. |

FOREIGN PATENT DOCUMENTS

| | | |
|---|---|---|
| CN | 103547347 A | 1/2014 |
| CN | 103814460 A | 5/2014 |
| CN | 103935080 A | 7/2014 |
| CN | 106797046 A | 5/2017 |
| CN | 108260366 A | 7/2018 |
| CN | 108367526 A | 8/2018 |
| DE | 102012023876 A1 | 7/2013 |
| JP | H10165311 A | 6/1998 |
| JP | 2004035604 A | 2/2004 |
| JP | 2008188494 A | 8/2008 |
| JP | 2014101441 A | 6/2014 |
| JP | 2016176135 A | 10/2016 |
| KR | 1020050113937 A | 12/2005 |
| KR | 1020090028278 A | 3/2009 |
| KR | 20100071746 A | 6/2010 |
| KR | 20100075227 A | 7/2010 |
| KR | 20170029376 A | 3/2017 |
| KR | 1020170113413 A | 10/2017 |
| KR | 1020170113414 A | 10/2017 |
| KR | 1020180009847 A | 1/2018 |
| KR | 1020180062170 A | 6/2018 |
| KR | 1020180062171 A | 6/2018 |
| KR | 1020180062172 A | 6/2018 |
| KR | 1020190005793 A | 1/2019 |
| WO | 9848978 A1 | 11/1998 |
| WO | 9849001 A1 | 11/1998 |
| WO | 2010123593 A2 | 10/2010 |
| WO | WO-2016158663 A1 * | 10/2016 |

OTHER PUBLICATIONS

Extended European Search Report corresponding to EP 19848038.6 dated Aug. 18, 2021 (8 pages).

* cited by examiner

ASYMMETRY COMPOSITE MATERIAL

CROSS-REFERENCE TO RELATED APPLICATIONS

This application is a 35 U.S.C. § 371 national stage application of PCT International Application No. PCT/KR2019/009791, filed Aug. 6, 2019, which claims priority from Korean Patent Application No. 10-2018-0091348, filed Aug. 6, 2018, the contents of which are incorporated herein in their entireties by reference. The above-referenced PCT International Application was published in the Korean language as International Publication No. WO2020/032535 on Feb. 13, 2020.

TECHNICAL FIELD

The present application relates to an asymmetry composite material and a method for preparing the same.

BACKGROUND ART

Metal foams can be applied to various fields including lightweight structures, transportation machines, building materials or energy absorbing devices, and the like by having various and useful properties such as lightweight properties, energy absorbing properties, heat insulating properties, refractoriness or environment-friendliness.

Metal foams not only have a high specific surface area, but also can further improve the flow of fluids, such as liquids and gases, or electrons, and thus can also be usefully used by being applied in a substrate for a heat exchanger, a catalyst, a sensor, an actuator, a secondary battery, a gas diffusion layer (GDL) or a microfluidic flow controller, and the like.

A composite material in which the metal foam and a resin component are combined with each other can be manufactured for the purpose of expanding application fields of the metal foam or reinforcing physical properties, and the like.

DISCLOSURE

Technical Problem

It is an object of the present application to provide an asymmetry composite material and a method for preparing the asymmetry composite material.

Technical Solution

The present application relates to an asymmetry composite material and a method for preparing the asymmetry composite material. The term composite material may mean a material comprising a metal porous body (metal foam or the like) and a polymer component.

Figure 1:
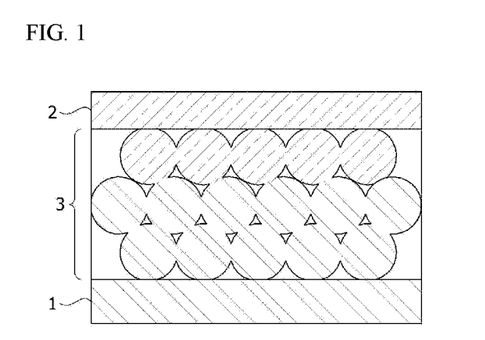
FIG. 1 is a cross-sectional diagram of an asymmetry composite material of the present application.

As shown in FIG. 1, an exemplary asymmetry composite material (10) comprises a first polymer layer (1), a metal porous body (3) and a second polymer layer (2) sequentially, wherein the first polymer layer (1) and the second polymer layer (2) may have different components. The fact that the first polymer layer and the second polymer layer have different components means that the compositions of a resin component to be described below or other additives, and the like are different from each other. In general, the conventional method for preparing a composite material in which a resin component is combined with a metal porous body is known widely. In general, when a polymer is coated on the metal porous body by a deep coating or blade coating method, it is inevitable to form a polymer layer having the same characteristics on the surface of the metal porous body, thereby limiting its application range. The present application provides a composite material having a variety of application areas by providing an asymmetry composite material having polymer layers with different properties on both sides of a metal porous body.

In this specification, the term metal porous body (metal foam or the like) or metal skeleton means a porous structure comprising a metal as a main component. Here, the metal as a main component means that the ratio of the metal is 55 wt % or more, 60 wt % or more, 65 wt % or more, 70 wt % or more, 75 wt % or more, 80 wt % or more, 85 wt % or more, 90 wt % or more, or 95 wt % or more based on the total weight of the metal porous body (metal foam or the like) or the metal skeleton. The upper limit of the ratio of the metal contained as the main component is not particularly limited, which may be, for example, 100 wt %, 99 wt % or 98 wt % or so.

In this specification, the term porous property may mean a case where porosity is at least 30% or more, 40% or more, 50% or more, 60% or more, 70% or more, 75% or more, or 80% or more. The upper limit of the porosity is not particularly limited, and may be, for example, about 99% or less, or about 98% or less, 95% or less, 90% or less, 85% or less, 80% or less, or 75% or less or so. The porosity can be calculated in a known manner by calculating the density of the metal porous body (metal foam or the like) or the like.

The metal porous body (metal foam or the like) included in the composite material of the present application may be in a film shape. The composite material of the present application may comprise a metal porous body (metal foam or the like) in such a film form and polymer components present on both opposite surfaces of the metal porous body (metal foam or the like). Here, the both opposite surfaces may mean surfaces facing each other such as upper and lower surfaces or both sides of a metal porous body (metal foam or the like) in the form of a film. Hereinafter, for convenience, among the surfaces of the metal porous body facing each other, the surface in which a first polymer layer exists may be referred to as a first surface and the surface, as the opposite surface, in which a second polymer layer exists may be referred to as a second surface. In one example, the second polymer layer component may not exist on the first surface, and the first polymer layer component may not exist on the second surface. In one example, the polymer component of the polymer layer may penetrate into the pores of the metal porous body, and for example, the polymer component of the first polymer layer may penetrate more than the polymer component of the second polymer layer. However, without being limited thereto, the polymer component of the second polymer layer may penetrate more into the pores of the metal porous body than the polymer component of the first polymer layer. That is, the contents of the first polymer layer component and the second polymer layer component penetrating into the pores of the metal porous body may be different from each other.

In one example, the metal porous body may comprise therein a first region in which the polymer component of the first polymer layer is present and a second region in which the polymer component of the second polymer layer is present. In this specification, the term polymer component may mean a resin component to be described below or other additives included in the polymer layer, and the like, and may also mean a polymer solution to be described below. In an embodiment of the present application, the thickness of the first region to the thickness of the porous metal body may be in a range of 0.01 to 0.99, 0.05 to 0.95, 0.08 to 0.9, 0.1 to 0.8, 0.2 to 0.7, 0.25 to 0.65, 0.3 to 0.6, 0.35 to 0.55 or 0.4 to 0.5. In addition, the thickness of the second region to the thickness of the porous metal body may be in a range of 0.01 to 0.99, 0.05 to 0.95, 0.08 to 0.9, 0.1 to 0.8, 0.2 to 0.7, 0.25 to 0.65, 0.3 to 0.6, 0.35 to 0.55 or 0.4 to 0.5. In the present application, the first polymer layer and the second polymer layer having different components may be disposed on both sides of the metal porous body, where the metal porous body may also have the polymer component of the first polymer layer and the second polymer component of the second polymer layer together inside the pores, and if necessary, the thicknesses of the first region and the second region may be adjusted.

In the composite material, the metal porous body (metal foam or the like) may have porosity in a range of about 30% to 99%. In one example, the porosity of the metal porous body (metal foam or the like) or the size of the pores, and the like can be controlled in consideration of a desired asymmetric structure in forming the composite material in a manner to be described below. For example, in forming an asymmetric structure by a method to be described below, when the porosity of the metal porous body (metal foam or the like) is small or the size of the pores is small, the degree that the light irradiated from one surface reaches the other surface is reduced and on the contrary, when it is large, the degree of reacting the other surface is increased, whereby a curing degree of a photocurable composition on the opposite surface can be controlled. In another example, the porosity may be 40% or more, 50% or more, 60% or more, 70% or more, 75% or more, or 80% or more, or may be 95% or less, 90% or less, 85% or less, or 80% or less or so.

The porous metal body (metal foam or the like) may be in the form of a film. The thickness of the film may be, for example, in a range of about 5 µm to 5 cm. In another example, the thickness may be 4 cm or less, 3 cm or less, 2 cm or less, 1 cm or less, 9000 µm or less, 8000 µm or less, 7000 µm or less, 6000 µm or less, 5000 µm or less, 4000 µm or less, 3000 µm or less, 2000 µm or less, 1000 µm or less, 900 µm or less, 800 µm or less, 700 µm or less, 600 or less, 500 µm or less, 400 µm or less, 300 µm or less, or 200 µm or less or so, or may also be 6 µm or more, 7 µm or more, 8 µm or more, 9 µm or more or 10 µm or more, 20 µm or more, 30 µm or more, 40 µm or more, 50 µm or more, 60 µm or more, 70 µm or more, 80 µm or more, 90 µm or more, or 95 µm or more or so.

The skeleton of the metal porous body (metal foam or the like) may be composed of various kinds of metals or metal alloys, which may comprise, for example, one or more metals or metal alloys selected from the group consisting of iron, cobalt, nickel, copper, phosphorus, molybdenum, zinc, manganese, chromium, indium, tin, silver, platinum, gold, aluminum, stainless steel and magnesium, or may consist of the metal or metal alloy.

Such metal porous bodies (metal foams and the like) are variously known, and methods for preparing a metal porous body (metal foam or the like) are also variously known. In the present application, such known metal porous bodies (metal foams and the like) and metal porous bodies (metal foams and the like) prepared by the known methods can be applied.

As a method for preparing a metal porous body (metal foam or the like), a method of sintering a pore-forming agent such as a salt and a composite material of a metal, a method of coating a metal on a support such as a polymer foam and sintering it in this state or a slurry method in which a binder, a solvent and a dispersant are prepared as a slurry, applied, dried and sintered, and the like is known. The present application can implement a metal foam having a desired pore size, thickness and porosity through the above method. Furthermore, the metal porous body (metal foam or the like) can also be prepared by a method disclosed in Korean Patent Application No. 2017-0086014, 2017-0040971, 2017-0040972, 2016-0162154, 2016-0162153 or 2016-0162152, and the like, which is a prior application of the present applicant.

The metal porous body (metal foam or the like) may also be prepared by the induction heating method from the methods described in the prior applications, where the metal porous body (metal foam or the like) may comprise at least a conductive magnetic metal. In this case, the metal porous body (metal foam or the like) may comprise 30 wt % or more, 35 wt % or more, 40 wt % or more, 45 wt % or more, or 50 wt % or more of the conductive magnetic metal on the basis of weight. In another example, the ratio of the conductive magnetic metal in the metal porous body (metal foam or the like) may be about 55 wt % or more, 60 wt % or more, 65 wt % or more, 70 wt % or more, 75 wt % or more, 80 wt % or more, 85 wt % or more, or 90 wt % or more. The upper limit of the ratio of the conductive magnetic metal is not particularly limited, and may be, for example, less than about 100 wt % or 95 wt % or less.

In the present application, the term conductive magnetic metal is a metal having predetermined relative magnetic permeability and conductivity, which may mean a metal capable of generating heat to such an extent that the metal can be sintered by the induction heating method.

In one example, as the conductive metal, a metal having relative magnetic permeability of 90 or more may be used. The relative magnetic permeability ($\mu r$) is a ratio ($\mu/\mu 0$) of the magnetic permeability ($\mu$) of the relevant material to the magnetic permeability ($\mu 0$) in the vacuum. In another example, the relative magnetic permeability may be 95 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, 350 or more, 360 or more, 370 or more, 380 or more, 390 or more, 400 or more, 410 or more, 420 or more, 430 or more, 440 or more, 450 or more, 460 or more, 470 or more, 480 or more, 490 or more, 500 or more, 510 or more, 520 or more, 530 or more, 540 or more, 550 or more, 560 or more, 570 or more, 580 or more, or 590 or more. The higher the relative magnetic permeability is, the higher the heat is generated at the time of application of the electromagnetic field for induction heating which is described below, whereby the upper limit is not particularly limited. In one example, the upper limit of the relative magnetic permeability may be, for example, about 300,000 or less.

The conductive magnetic metal may have conductivity at 20° C. of about 8 MS/m or more, 9 MS/m or more, 10 MS/m or more, 11 MS/m or more, 12 MS/m or more, 13 MS/m or more, or 14.5 MS/m or more. The upper limit of the conductivity is not particularly limited, and for example, the conductivity may be about 30 MS/m or less, 25 MS/m or less, or 20 MS/m or less.

A specific example of such a conductive magnetic metal includes nickel, iron or cobalt, and the like, but is not limited thereto.

As mentioned above, the composite material of the present application may be an asymmetry composite material.

The asymmetry composite material may mean that the first polymer layer and the second polymer layer present on both sides of the metal porous body have different components. The components of the first polymer layer and the second polymer layer mean a case where polymer components or resin components to be described below are different from each other, or other additives are different from each other. Here, the polymer component and the resin component may be used in the same sense.

In one example, the resin component included in the first polymer layer or the second polymer layer may comprise, for example, a styrene-based resin or elastomer, a polyolefin-based resin or elastomer, other elastomers, a polyoxyalkylene-based resin or elastomer, or a polyester-based resin or elastomer, a polyvinyl chloride-based resin or elastomer, a polycarbonate-based resin or elastomer, a polyphenylene-sulfide-based resin or elastomer, a mixture of hydrocarbons, a polyamide-based resin or elastomer, an acrylate-based resin or elastomer, an epoxy-based resin or elastomer, a silicone-based resin or elastomer, a fluorine-based resin or elastomer, or a mixture thereof, and the like.

Here, as the styrene resin or elastomer, for example, styrene-ethylene-butadiene-styrene block copolymer (SEBS), styrene-isoprene-styrene block copolymer (SIS), acrylonitrile-butadiene-styrene block copolymer (ABS), acrylonitrile-styrene-acrylate block copolymer (ASA), styrene-butadiene-styrene block copolymer (SBS), styrene homopolymer or a mixture thereof can be exemplified. As the olefin resin or elastomer, for example, a high density polyethylene resin or elastomer, a low density polyethylene resin or elastomer, a polypropylene resin or elastomer or a mixture thereof can be exemplified. As the elastomer, for example, an ester thermoplastic elastomer, an olefin elastomer, a silicone elastomer, an acrylic elastomer or a mixture thereof, and the like can be used. In particular, as the olefin thermoplastic elastomer, a polybutadiene resin or elastomer or a polyisobutylene resin or elastomer, and the like can be used. As the polyoxyalkylene resin or elastomer, for example, a polyoxymethylene resin or elastomer, a polyoxyethylene resin or elastomer or a mixture thereof, and the like can be exemplified. As the polyester resin or elastomer, for example, a polyethylene terephthalate resin or elastomer, a polybutylene terephthalate resin or elastomer or a mixture thereof, and the like can be exemplified. As the polyvinyl chloride resin or elastomer, for example, polyvinylidene chloride and the like can be exemplified. As the mixture of hydrocarbons, for example, hexatriacotane or paraffin, and the like can be exemplified. As the polyamide resin or elastomer, for example, nylon and the like can be exemplified. As the acrylate resin or elastomer, for example, polybutyl (meth)acrylate and the like can be exemplified. As the epoxy resin or elastomer, for example, bisphenol types such as bisphenol A type, bisphenol F type, bisphenol S type and a hydrogenated product thereof; novolak types such as phenol novolak type or cresol novolak type; nitrogen-containing cyclic types such as triglycidyl isocyanurate type or hydantoin type; alicyclic types; aliphatic types; aromatic types such as naphthalene type and biphenyl type; glycidyl types such as glycidyl ether type, glycidyl amine type and glycidyl ester type; dicyclo types such as dicyclopentadiene type; ester types; ether ester types or a mixture thereof, and the like can be exemplified. As the silicone resin or elastomer, for example, polydimethylsiloxane and the like can be exemplified. In addition, as the fluororesin or elastomer, a polytrifluoroethylene resin or elastomer, a polytetrafluoroethylene resin or elastomer, a polychlorotrifluoroethylene resin or elastomer, a polyhexafluoropropylene resin or elastomer, polyfluorinated vinylidene, polyfluorinated vinyl, polyfluorinated ethylene propylene or a mixture thereof, and the like can be exemplified.

The resins or elastomers listed above may be also used, for example, by being grafted with maleic anhydride or the like, by being copolymerized with other resins or elastomers through monomers for producing resins or elastomers, and by being modified with other compounds. An example of other compounds above may include carboxyl-terminal butadiene-acrylonitrile copolymers and the like.

On the other hand, more specifically, when the polymer layer is a cured product of the curable composition, the resin component may comprise a polymer that is cured by light irradiation or heat application, and the like. The term "thermosetting resin" means a resin that can be cured through an appropriate heat application or aging process, and the term "photocurable resin" means a resin that can be cured by irradiation of electromagnetic waves. Furthermore, the curable resin may be a dual curable resin including both thermosetting and photocuring properties. In the present specification, the light irradiation may also include irradiation of particle beams, such as alpha-particle beams, proton beams, neutron beams and electron beams, as well as microwaves, infrared (IR), ultraviolet (UV), X-rays and gamma rays, and the like.

Such a curable composition can be exemplified by an acrylic curable composition, an epoxy curable composition, an isocyanate curable composition, a urethane curable composition, a polyester curable composition, a polyamic acid curable composition, a polyamide curable composition, a phthalonitrile curable composition or a silicone curable composition, and the like. Each of the compositions is a composition that can be cured to form an acrylic polymer component, an epoxy polymer component, an isocyanate polymer component, a urethane polymer component, a polyester polymer component, a polyamic acid polymer component, a polyamide polymer component, a phthalonitrile resin polymer component or a silicone polymer component, and such compositions are variously known in the polymer composition industry, whereby in the present application, an appropriate component can be selected from such known components and used, and if necessary, a complex polymer can also be formed by using two or more components of the foregoing.

Generally, such a composition comprises a polymer component, oligomer component and/or monomer component having a functional group that can be cured by light irradiation or application of heat, and comprises an initiator capable of initiating curing reaction by irradiation of light and/or application of heat, for example, a radical initiator, a cationic initiator, etc., or other curing agents, and the like. Here, the functional group that can be cured by light irradiation or application of heat can be exemplified by a functional group containing a radically polymerizable double bond such as an acryloyl group or a methacryloyl group, or a cationic polymerizable functional group or the like such as a glycidyl group, an alicyclic epoxy group or an oxetanyl group, or a hydrogen atom bonded to a silicon atom, an alkenyl group such as a vinyl group, an isocyanate group, a carboxyl group, a hydroxyl group, an epoxy group, an aziridine group, and the like, but is not limited thereto.

In one example, the resin component in the first or second polymer layer may have a weight average molecular weight (Mw) to an extent such that the polymer layer can be formed into a film shape. For example, the resin component may have a weight average molecular weight of about 100,000 to 2,000,000, 120,000 to 1,500,000, or 150,000 to 1,000,000 or so. The term weight average molecular weight herein means a value converted to standard polystyrene measured by GPC (gel permeation chromatograph). However, the resin component does not necessarily have the above-mentioned weight average molecular weight. For example, in the case where the molecular weight of the resin component is not in a level enough to form a film, a separate binder resin may be blended into the composition.

In an embodiment of the present application, the first polymer layer or the second polymer layer may comprise the resin component and a curing agent or initiator according to the same, which may be appropriately combined according to the desired properties in the desired technical field by those skilled in the art. For example, a polymer component having tackiness may be included in one side of the metal porous body and a polymer component having adhesiveness may be included in the other side. Also, without being limited thereto, a polymer layer having electrical conductivity may be formed on one side of the metal porous body and a polymer layer having electrical insulation may be formed on the other side. In addition, a polymer layer having excellent tensile characteristics may be formed on one side of the metal porous body and a polymer layer having excellent characteristics against compression may be formed on the other side. The above example can be designed by those skilled in the art in consideration of necessary physical properties according to the use of the metal porous body.

In one example, the first polymer layer may be an electrically conductive layer having a surface resistance measured in accordance with JIS K 7194 standard in a range of 10Ω/□ or less, and the second polymer layer may be an electrical insulation layer having a surface resistance measured according to JIS K 7194 standard in a range of 1000Ω/□ or more. In one example, the surface resistance of the electrically conductive layer may be in the range of 0.01 to 9Ω/□ or 0.1 to 5Ω/□, and the surface resistance of the electrical insulation layer may be in the range of 1000 to 5000Ω/□ or in the range of 1500 to 4000Ω/□. Also, in one example, the first polymer layer may have peel force (peel rate: 0.3 m/min, peel angle: 180°) to a copper metal plate of 0.1 to 100 g/mm or 1 to 90 g/mm, and the second polymer layer may have peel force to a copper metal plate (peel rate: 0.3 m/min, peel angle: 180°) of 10 to 1000 g/mm or more than 100 g/mm and 1000 g/mm or less. Furthermore, in one example, the first polymer layer may have a tensile elastic modulus at 25° C. in a range of 0.01 MPa to 10 MPa or 0.1 MPa to 5 MPa, and the second polymer layer may have a tensile elastic modulus at 25° C. in a range of 100 MPa to 1000 MPa or 300 MPa to 800 MPa. The present application can configure the composite material so that the first polymer layer and the second polymer layer satisfy the desired physical properties depending on the applied used of the composite material and also according to its needs.

In an embodiment of the present application, the first or second polymer layer may further comprise a radical initiator, depending on the kind of the resin component. The radical initiator may be a photoinitiator or a thermal initiator. The specific kind of the photoinitiator can be appropriately selected in consideration of curing rate and yellowing possibility, and the like. For example, benzoin-based, hydroxy ketone-based, amino ketone-based or phosphine oxide-based photoinitiators, and the like can be used, and specifically, benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenyl ketone, 2-methyl-1-[4-(methylthio)phenyl]-2-morpholino-propan-1-one, 4-(2-hydroxyethoxy)phenyl-2-(hydroxy-2-propyl) ketone, benzophenone, p-phenylbenzophenone, 4,4'-diethylaminobenzophenone, diclorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo [2-hydroxy-2-methyl-1-[4-(1-methylvinyl)phenyl]propanone] and 2,4,6-trimethylbenzoyl-diphenyl-phosphine oxide, and the like can be used.

The radical initiator may also be included in a ratio of 0.2 parts by weight to 20 parts by weight, 0.5 to 18 parts by weight, 1 to 15 parts by weight or 2 parts by weight to 13 parts by weight relative to 100 parts by weight of the resin component.

In an embodiment of the present application, the first or second polymer layer may further comprise a curing agent, depending on the kind of the resin component. For example, it may further comprise a curing agent that can react with the above-described resin component to form a crosslinked structure or the like.

The kind of the curing agent may be appropriately selected and used depending on the type of the resin component or the functional group contained in the resin.

In one example, when the resin component is an epoxy resin, the curing agent is a curing agent of the epoxy resin known in the art, and for example, one or two or more of an amine curing agent, an imidazole curing agent, a phenol curing agent, a phosphorus curing agent or an acid anhydride curing agent, and the like can be used, without being limited thereto.

In one example, as the curing agent, an imidazole compound which is solid at room temperature and has a melting point or a decomposition temperature of 80° C. or higher can be used. As such a compound, for example, 2-methylimidazole, 2-heptadecylimidazole, 2-phenylimidazole, 2-phenyl-4-methylimidazole or 1-cyanoethyl-2-phenylimidazole, and the like may be exemplified, but is not limited thereto.

The content of the curing agent may be selected depending on composition of the composition, for example, the type or ratio of the resin component. For example, the curing agent may be contained in an amount of 1 part by weight to 20 parts by weight, 1 part by weight to 10 parts by weight or 1 part by weight to 5 parts by weight, relative to 100 parts by weight of the resin component. However, the weight ratio can be changed depending on the type and ratio of the resin component or the functional group of the resin, or the cross-linking density to be implemented, and the like.

When the resin component is a resin which can be cured by irradiation of the active energy ray, for example, a cationic photopolymerization initiator may be used as the initiator.

As the cationic photopolymerization initiator, ionized cationic initiators of onium salt organometallic salt series, or nonionized cationic photopolymerization initiators of organic silane or latent sulfonic acid series can be used. As the initiator of the onium salt series, diaryliodonium salt, triarylsulfonium salt or aryldiazonium salt, and the like can be exemplified, as the initiator of the organometallic salt series, iron arene and the like can be exemplified, as the initiator of the organosilane series, o-nitrobenzyl triaryl silyl ether, triaryl silyl peroxide or acyl silane, and the like can be exemplified, and as the initiator of the latent sulfuric acid series, α-sulfonyloxy ketone or α-hydroxymethylbenzoin sulfonate, and the like can be exemplified, without being limited thereto.

In one example, as the cationic initiator, an ionized cationic photopolymerization initiator may be used.

In one example, the first or second polymer layer may further comprise inorganic particles, if necessary. The specific kind of the usable inorganic particles (or fillers) in the present application is not particularly limited, and for example, one or a mixture of two or more of clay, talc, alumina, calcium carbonate, zirconia or silica, and the like may be used.

The inorganic particles of the present application may be included in an amount of 1 to 70 parts by weight or 25 to 50 parts by weight relative to 100 parts by weight of the resin component. In addition, the inorganic particles may have an average particle diameter measured by a D50 particle size analyzer in a range of 5 to 100 nm or 8 to 40 nm. In addition, the inorganic particles may have a refractive index in a range of 1.2 to 2.0 or 1.4 to 1.7. As the first or second polymer layer of the present application comprises the inorganic particles, the cured product of the desired physical property may be prepared.

In one example, the first or second polymer layer may further comprise conductive particles, if necessary. The conductive particles may comprise a conductive metal, such as silver, copper, nickel, gold, aluminum or graphite. In addition, the conductive particles may be single conductive metal particles, or may be in a form in which a second conductive metal is coated on first conductive metal particles. For example, the conductive particles may comprise one or more of graphite powder, copper powder, silver powder, nickel powder, silver-coated copper powder (Ag-coated Cu powder), gold-coated copper powder, silver-coated nickel powder (Ag-coated Ni powder) and gold-coated nickel powder. The conductive particles may have a spherical shape, a dendrite shape, a rod shape, a needle shape, a flake shape, or a rugby ball shape. Specifically, as the conductive particles, a dendrite type may be used, where the polymer layer has excellent conductivity as compared to the conductive particle content. When the conductive particles are included, the conductive particles may be included in an amount of 3 to 50 parts by weight or 5 to 30 parts by weight relative to 100 parts by weight of the resin component.

In addition to the above-described constitutions, the polymer layer may comprise various additives depending on applications and the manufacturing process of the composite material to be described below. For example, the first or second polymer layer may comprise a tackifier, a polyfunctional active energy ray curable material, a crosslinking agent or a filler, and the like in a content of an appropriate range depending on the desired physical properties.

In one example, the first polymer layer or the second polymer layer may have a thickness range of 5 to 100 μm, 8 to 80 μm, 12 to 60 μm, 15 to 40 μm or 18 to 28 μm. The thickness of the first polymer layer and the thickness of the second polymer layer may be different or the same. The composite material of the present application may have the same thickness or may make the thickness of the first polymer layer thicker than the thickness of the second polymer layer, depending on the physical properties of the two polymer layers as described above. On the contrary, the present application may also make the thickness of the second polymer layer thicker than the thickness of the first polymer layer.

The composite material of the present application can be used as a heat insulating material, a heat dissipating material, a soundproof material, a lightweight material, a structural material or an electrode material, and the like.

The present application also relates to a method for preparing an asymmetry composite material. The above-mentioned asymmetry composite material may be prepared by the following preparation method.

The preparation method may comprise a step of applying a first polymer layer to the other side of a metal porous body in which a resin layer is attached to one side. The other side of the metal porous body may mean a surface that the resin layer is not attached to the metal porous body (metal foam or the like). The resin layer may be a pressure-sensitive adhesive layer, but is not limited thereto. In addition, the step of applying a first polymer layer may comprise applying a first polymer layer solution including a polymer component of the first polymer layer.

Figure 2:
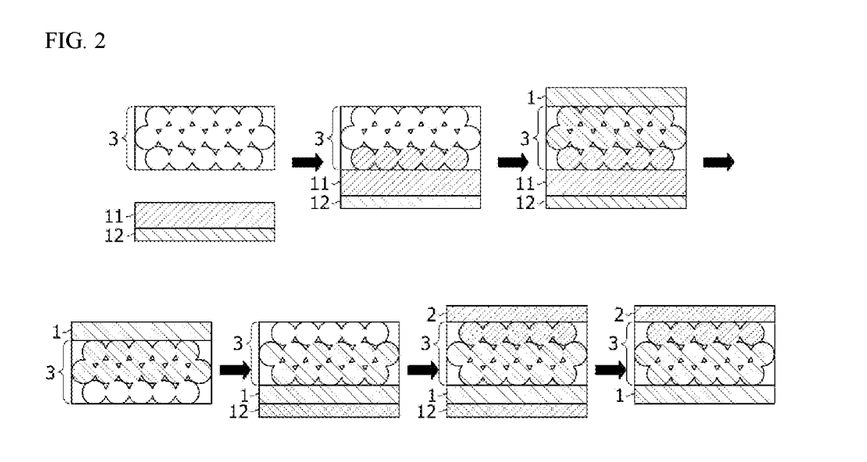
FIG. 2 is an exemplary diagram for explaining a method of manufacturing an asymmetry composite material of the present application.

In one example, as shown in FIG. 2, when one side of the metal porous body (metal foam or the like) (3) or the like is attached to the resin layer (11), at least a portion of the resin layer (11) penetrates into pores of the metal porous body (metal foam or the like) (3) by the porous property of the metal porous body (metal foam or the like) (3). Thereafter, when the first polymer layer (1) is applied to the surface of the metal porous body (metal foam or the like) (3) in which the resin layer (11) does not exist, the first polymer layer (1) does not penetrate into at least the pores in which the resin layer (11) exists. Of course, when the viscosity of the first polymer layer (1) or the like is adjusted, the first polymer layer (1) does not penetrate into some of the pores without the resin layer (1) by adjusting the degree of penetration into the pores. In this state, the preparation method of the present application may comprise a step of curing or crosslinking the first polymer layer (1). In FIG. 2, the reference numeral 12 is a base film or a release film which supports the resin layer (11).

In the method of the present application, in order to control the degree of penetration of the resin layer into the metal porous body pores, the step of placing the metal porous body (metal foam or the like) on the resin layer and pressing the metal porous body to attach the pressure-sensitive adhesive layer may also be performed. That is, the pressure-sensitive adhesive layer can penetrate into more pores by this pressurization, thereby adjusting the structure of the asymmetric film.

Furthermore, alternatively, it is also possible to control the degree of penetration of the resin layer into pores through the method of controlling the thickness of the resin layer, thereby controlling the structure of the asymmetrical film.

The kind of the resin layer applicable in the present application is not particularly limited, where a known general resin layer or pressure-sensitive adhesive layer may be used. For example, the above method can be performed using a pressure-sensitive adhesive sheet or a pressure-sensitive adhesive film that the pressure-sensitive adhesive layer is formed on one surface thereof. At this time, the applicable pressure-sensitive adhesive includes a known acrylic pressure-sensitive adhesive, silicone pressure-sensitive adhesive, urethane pressure-sensitive adhesive or epoxy pressure-sensitive adhesive, and the like, but is not limited thereto.

The preparation method of the present application may comprise a step of curing or crosslinking the first polymer layer (1). The method of performing the curing or crosslinking in the above process is not particularly limited, and a method such as appropriate light irradiation or heat application may be applied depending on the kind of the applied resin component of the polymer layer. If necessary, it may also further perform a step of removing the uncured or uncross-linked composition after the curing or crosslinking.

According to the above method, the shapes of the asymmetric structure can be variously adjusted by controlling the curing or crosslinking conditions, for example, the degree or direction of light irradiation, the degree of heat application and the like, the thickness of the pressure-sensitive adhesive layer, the thickness of the polymer layer and/or the thickness of the metal porous body (metal foam or the like), or the porosity or pore size of the metal porous body (metal foam or the like).

In one example, the process may form the first polymer layer on at least one of the first and second surfaces of the porous structure (metal foam or the like) to a thickness in a range of about 1 nm to 2 cm.

The preparation method of the present application may further perform a step of removing the uncured or uncross-linked polymer layer component after the curing or cross-linking.

By this process, the above-described asymmetric structure can be formed. The step of removing the uncured or uncross-linked polymer layer component may be referred to as developing. Such a developing process may be performed in a known manner, and for example, the developing process may be performed using a processing agent or the like known to be capable of removing the uncured or uncross-linked composition, where developers such as ethanol, salt water, N-methylpyrrolidone, methylene chloride, chloroform, toluene, ethylene glycol or propylene glycol monomethyl ether acetate, and the like are known as the processing agent. The developing process can be performed through appropriate treatment using such a developer, and for example, the developing process can be performed by applying the developer in a spray developing manner at a pressure of about 2 bar or more and a temperature range of 20° C. to 50° C.

After the curing or crosslinking step, the method of the present application may further perform a step of removing the resin layer. The method of removing the resin layer is not particularly limited. Since the resin layer has a property of being attached to an adherend by application of pressure and being removed by peeling, an appropriate removal method may be selected depending on the type of the applied resin layer.

If necessary, the present application may further perform a step of washing the residues of the resin layer following the above step, where this step may be performed in a manner similar to the above-described development step.

After the step of removing the resin layer (11), the preparation method of the present application may further comprise a step of applying a second polymer layer (2) to one side of the metal porous body (3) from which the resin layer (11) has been removed. The second polymer layer (2) may be applied in the same manner as the application of the first polymer layer (1) as described above. In addition, the preparation method of the present application may further perform a step of curing or crosslinking the second polymer layer (2), where the curing or crosslinking may proceed according to the type of the resin component.

Advantageous Effects

The present application provides a composite material comprising a metal porous body (metal foam or the like) and a polymer component, and provides a method for preparing a composite material, wherein the polymer component is formed in an asymmetrical structure on both sides of the metal porous body (metal foam or the like), and a composite material prepared in such a manner.

EXPLANATION OF REFERENCE NUMERALS

1: first polymer layer
2: second polymer layer
3: metal porous body
11: pressure-sensitive adhesive layer
12: base material or release film

BEST MODE

Hereinafter, the present application will be described in detail by way of examples and comparative examples, but the scope of the present application is not limited to the following examples.

Example 1

A metal porous body was a copper metal foam, where the copper metal foam being in the form of a film having a thickness of 100 μm and having porosity of approximately 75% or so was used. While using a pressure-sensitive adhesive sheet (base material PET) having an acrylic pressure-sensitive adhesive layer with a thickness of 10 μm, the metal foam was placed on the pressure-sensitive adhesive layer and then pressurized with a load of about 3 Kg. Thereafter, polydimethylsiloxane (PDMS, Sylgard 184) was coated on the opposite surface of one surface in contact with the pressure-sensitive adhesive layer of the pressurized copper foam to a thickness of 20 μm, using a film applicator and thermal curing heated in an oven at 120° C. for 20 minutes to form a first polymer layer. After curing, the pressure-sensitive adhesive sheet (PET-pressure-sensitive adhesive layer) was removed to prepare a composite material. Then, on the surface from which the pressure-sensitive adhesive sheet of the composite material was removed, an epoxy resin (Kukdo Chemical, Resin YD-128+curing agent G640) was coated with a film applicator to a thickness of 20 μm for forming a second polymer layer and heated in an oven at 80° C. for 60 minutes to prepare an asymmetry composite material.

Example 2

An asymmetry composite material was prepared in the same method as in Example 1, except that as the second polymer layer, a thermosetting acrylic resin (LG Chem) was coated with a film applicator to a thickness of 20 μm and heated in an oven at 80° C. for 60 minutes.

Example 3

An asymmetry composite material was prepared in the same method as in Example 1, except that as the second polymer layer, a coating liquid, in which polydimethylsiloxane (PDMS, Sylgard 184) and copper powder (particle diameter: 10 nm, dendrite type) were mixed at a weight ratio of 90:10, was coated to a thickness of 20 μm with a film applicator and heated in an oven at 120° C. for 20 minutes.

Example 4

An asymmetry composite material was prepared in the same method as in Example 1, except that as the second polymer layer, a coating liquid, in which polydimethylsiloxane (PDMS, Sylgard 184) and graphite powder (particle diameter 5 μm, flake type) were mixed at a weight ratio of 90:10, was coated to a thickness of 20 μm with a film applicator and heated in an oven at 120° C. for 20 minutes.

Example 5

An asymmetry composite material was prepared in the same method as in Example 1, except that as the first polymer layer, a coating liquid, in which polydimethylsiloxane (PDMS, Sylgard 184) and copper powder (particle diameter: 10 nm, dendrite type) were mixed at a weight ratio of 90:10, was coated to a thickness of 20 μm with a film applicator and heated in an oven at 120° C. for 20 minutes to form the first polymer layer, and As the second polymer layer, a coating liquid, in which polydimethylsiloxane (PDMS, Sylgard 184) and copper powder (particle diameter: 10 nm, dendrite type) were mixed at a weight ratio of 70:30, was coated to a thickness of 20 μm with a film applicator and heated in an oven at 120° C. for 20 minutes to form the second polymer layer.

Comparative Example 1

An asymmetry composite material was prepared in the same method as in Example 1, except that the pressure-sensitive adhesive sheet having an acrylic pressure-sensitive adhesive layer was not applied to the metal foam. Specifically, on the copper metal foam of Example 1, polydimethylsiloxane (PDMS, Sylgard 184) was coated on one side of the copper foam with a film applicator to a thickness of 20 μm and heated in an oven at 120° C. for 20 minutes to form the first polymer layer. After curing, an epoxy resin (Kukdo Chemical, Resin YD-128+curing agent G640) was coated with a film applicator to a thickness of 20 μm for forming the second polymer layer and heated in an oven at 80° C. for 60 minutes to prepare an asymmetry composite material.

Experimental Example 1-Surface Resistance Measurement

For the polymer layers of the composite materials prepared in Examples 3 to 5, the surface resistance was measured according to the standard test method with MITSUBISHI CHEMICAL CORPORATION, MCP-HT450 surface resistance meter. The measurement of the surface resistance was performed by measuring the surface resistance value under the environment of 23° C. and 50% relative humidity.

Experimental Example 2-Peel Force Measurement

After storing the first polymer layers or the second polymer layers of the composite materials prepared in Examples 1 and 2 for 3 days under 25° C. and 50% relative humidity, the peel force of the first or second polymer layers to a copper plate (peel rate: 5 mm/sec, peel angle: 180 degrees) was measured.

The measurement was measured under constant temperature and humidity conditions and the peel force was measured based on ASTM3330 using a texture analyzer.

TABLE 1

|  | First polymer layer Peel force (g/mm) | Second polymer layer Peel force (g/mm) |
| --- | --- | --- |
| Example 1 | 0.5 | Not measurable |
| Example 2 | 0.5 | 50 |

The second polymer layer of Example 1 is not re-peelable and cured to have no pressure-sensitive adhesive property.

TABLE 2

|  | First polymer layer Surface resistance (Ω/□) | Second polymer layer Surface resistance (Ω/□) |
| --- | --- | --- |
| Example 3 | $4.0 \times 10^{13}$ | $3.2 \times 10^{-1}$ |
| Example 4 | $4.0 \times 10^{13}$ | $5.1 \times 10^{-1}$ |
| Example 5 | $3.2 \times 10^{-1}$ | $2.3 \times 10^{-2}$ |

In Comparative Example 1, upon coating polydimethylsiloxane (PDMS, Sylgard 184) as the first polymer layer, the liquid polydimethylsiloxane was applied to the first surface of the copper foam (the surface of the copper foam to which the first polymer layer was applied), and then penetrated into the pores and simultaneously penetrated to the second surface (the opposite surface of the first surface), whereby the first polymer layer was consequently formed on both sides of the metal copper foam. Thereafter, even if the second polymer layer is applied, the second polymer layer is formed on the first polymer layer already formed on the second surface.

What is claimed is:

1. An asymmetry composite material, comprising:
   a first polymer layer,
   a metal porous body, and
   a second polymer layer,
   wherein the first polymer layer, the metal porous body and the second polymer layer are sequentially stacked, wherein the first polymer layer and the second polymer layer comprise different components, wherein the first polymer layer penetrates into pores of a first surface of the metal porous body, wherein the second polymer layer penetrates into pores of a second surface of the metal porous body, wherein a first region formed by a first polymer component of the first polymer layer penetrating into the pores and a second region formed by the second polymer layer penetrating into the pores are present inside of the metal porous body, wherein only the first region and the second region are present inside of the metal porous body, and wherein a thickness of the first region is in a range of 0.05 to 0.95 times a thickness of the metal porous body.

2. The asymmetry composite material according to claim 1, wherein the metal porous body is in the form of a film having a thickness in a range of 5 μm to 5 cm.

3. The asymmetry composite material according to claim 1, wherein the metal porous body comprises one or more metals or metal alloys selected from the group consisting of iron, cobalt, nickel, copper, phosphorus, molybdenum, zinc, manganese, chromium, indium, tin, silver, platinum, gold, aluminum, stainless steel and magnesium.

4. The asymmetry composite material according to claim 1, wherein the metal porous body is a metal foam.

5. The asymmetry composite material according to claim 1, wherein the metal porous body has a porosity in a range of 30% to 85%.

6. The asymmetry composite material according to claim 1, wherein the thickness of the first region is in a range of 0.08 to 0.9 times the thickness of the metal porous body.

7. An asymmetry composite material, comprising:
a first polymer layer,
a metal porous body, and
a second polymer layer,
wherein the first polymer layer, the metal porous body and the second polymer layer are sequentially stacked, wherein the first polymer layer and the second polymer layer comprise different components, wherein the first polymer layer penetrates into pores of a first surface of the metal porous body, wherein the second polymer layer penetrates into pores of a second surface of the metal porous body, and wherein the second polymer layer is an electrical insulation layer having a surface resistance measured according to JIS K 7194 standard in a range of 1000Ω/☐ or more.

8. The asymmetry composite material according to claim 1, wherein the first polymer layer has a peel force to a copper metal plate of 0.1 to 100 g/mm when a peel rate is 0.3 m/min, and a peel angle is 180°, and the second polymer layer has a peel force to a copper metal plate of 10 to 1000 g/mm when a peel rate is 0.3 m/min, and a peel angle is 180°.

9. The asymmetry composite material according to claim 1, wherein the first polymer layer has a tensile elastic modulus at 25° C. in a range of 0.01 MPa to 10 MPa, and the second polymer layer has a tensile elastic modulus at 25° C. in a range of 100 MPa to 1000 MPa.

10. The asymmetry composite material according to claim 1, wherein the first polymer layer or the second polymer layer comprises a resin component.

11. The asymmetry composite material according to claim 1, wherein the first polymer layer or the second polymer layer further comprises inorganic particles.

12. The asymmetry composite material according to claim 7, wherein the first polymer layer is an electrically conductive layer having a surface resistance measured according to JIS K 7194 standard in a range of 10Ω/☐ or less.

* * * * *

UNITED STATES PATENT AND TRADEMARK OFFICE
CERTIFICATE OF CORRECTION

PATENT NO. : 11,718,073 B2
APPLICATION NO. : 17/261601
DATED : August 8, 2023
INVENTOR(S) : Shin et al.

Page 1 of 1

It is certified that error appears in the above-identified patent and that said Letters Patent is hereby corrected as shown below:

On the Title Page

Item (73) Assignee: Please correct "LG CHEM. LTD." to read --LG CHEM, LTD.--

Signed and Sealed this
Twenty-sixth Day of September, 2023

Katherine Kelly Vidal
*Director of the United States Patent and Trademark Office*